US012280276B2

(12) United States Patent

Ziaylek et al.

(10) Patent No.: US 12,280,276 B2

(45) Date of Patent: Apr. 22, 2025

(54) BRACKET SYSTEMS FOR STORING AND DEPLOYING ARTICLES OF EQUIPMENT

(71) Applicant: Michael P. Ziaylek, Yardley, PA (US)

(72) Inventors: Michael P. Ziaylek, Yardley, PA (US); James Jarozynski, Collingswood, NJ (US); Keith R. Creely, Levittown, PA (US)

(73) Assignee: ZIAMATIC, LLC, Yardley, PA (US)

( * ) Notice: Subject to any disclaimer, the term of this patent is extended or adjusted under 35 U.S.C. 154(b) by 316 days.

(21) Appl. No.: 17/727,911

(22) Filed: Apr. 25, 2022

(65) Prior Publication Data

US 2022/0339476 A1 Oct. 27, 2022

Related U.S. Application Data

(60) Provisional application No. 63/179,010, filed on Apr. 23, 2021.

(51) Int. Cl.
*A62B 25/00* (2006.01)

(52) U.S. Cl.
CPC .................................... *A62B 25/00* (2013.01)

(58) Field of Classification Search
CPC ........... A62B 25/00; A62B 9/04; A62C 13/78; B60R 11/00
See application file for complete search history.

(56) References Cited

U.S. PATENT DOCUMENTS

| | | | | | |
|---|---|---|---|---|---|
| 3,603,550 | A * | 9/1971 | Byrd | A62C 13/78 | 248/154 |
| 3,637,097 | A * | 1/1972 | Horowitz | B60P 1/4442 | 414/917 |
| 4,021,070 | A * | 5/1977 | Shea | B66F 19/00 | 414/547 |
| 4,586,687 | A * | 5/1986 | Ziaylek, Jr. | A62B 25/00 | 211/75 |
| 4,848,714 | A * | 7/1989 | Ziaylek, Jr. | A62C 13/78 | 248/313 |
| 5,421,495 | A * | 6/1995 | Bubik | B60R 9/042 | 224/310 |
| 6,019,567 | A * | 2/2000 | Lutkus | B60P 1/4442 | 414/556 |
| 6,086,312 | A * | 7/2000 | Ziaylek | B60P 7/12 | 414/917 |

(Continued)

FOREIGN PATENT DOCUMENTS

EP 2374510 B1 * 5/2015 ............. A62B 25/00

*Primary Examiner* — Patrick D Hawn

(74) *Attorney, Agent, or Firm* — Fox Rothschild LLP; Carol E. Thorstad-Forsyth

(57) ABSTRACT

A bracket system is provided for the storage and retrieval of an article of equipment such as a self-contained breathing apparatus of the type used by firefighters and other first responders to provide breathing air during firefighting and other emergency operations. The bracket system securely stores the article of equipment in a position at which the article of equipment has an upside down, or inverted orientation, facing the back of the storage area. The bracket system is configured to articulate in a manner that positions the article of equipment in a lowered position at which the article of equipment has an upright orientation, facing the user, so that the user can retrieve the article of equipment.

19 Claims, 13 Drawing Sheets

(56) References Cited

U.S. PATENT DOCUMENTS

| | | | | |
|---|---|---|---|---|
| 6,427,889 | B1 * | 8/2002 | Levi | B60R 9/0423 224/310 |
| 6,428,263 | B1 * | 8/2002 | Schellens | B60R 9/042 224/310 |
| 6,543,736 | B2 * | 4/2003 | Field | A62B 25/00 248/313 |
| D494,049 | S * | 8/2004 | Ziaylek | D8/373 |
| D494,453 | S * | 8/2004 | Ziaylek | D8/373 |
| 6,830,226 | B2 * | 12/2004 | Field | A62B 25/00 248/313 |
| 6,883,766 | B1 * | 4/2005 | Ziaylek | A62B 9/04 248/316.1 |
| 7,448,586 | B2 * | 11/2008 | Ziaylek | A62B 25/00 248/311.3 |
| 8,152,123 | B2 * | 4/2012 | Ziaylek | A62B 25/00 248/312 |
| 8,220,764 | B2 * | 7/2012 | Ziaylek | A62B 25/00 248/316.1 |
| 8,297,635 | B2 * | 10/2012 | Agoncillo | B60R 3/02 280/166 |
| 8,382,419 | B2 * | 2/2013 | Agoncillo | B66F 9/18 414/910 |
| 8,640,933 | B1 * | 2/2014 | McCray | B60R 9/042 224/325 |
| 8,668,178 | B2 * | 3/2014 | Ziaylek | F17C 13/084 224/570 |
| 8,985,933 | B2 * | 3/2015 | Ziaylek | E06C 5/24 414/469 |
| 9,168,189 | B2 * | 10/2015 | Ziaylek | A62B 25/00 |
| 9,388,029 | B2 * | 7/2016 | Ziaylek | B65G 7/00 |
| D777,562 | S * | 1/2017 | Ziaylek | D8/373 |
| 9,694,756 | B2 * | 7/2017 | Pullman | B60R 9/045 |
| 9,764,171 | B2 * | 9/2017 | Ziaylek | A62B 25/00 |
| 9,814,914 | B2 * | 11/2017 | Ziaylek | F16F 7/1017 |
| 10,189,417 | B1 * | 1/2019 | Morken | B60R 9/042 |
| 10,246,025 | B1 * | 4/2019 | Knigge | B60R 9/042 |
| 10,682,537 | B2 * | 6/2020 | Lackore, Jr. | B62D 33/06 |
| 10,689,906 | B2 * | 6/2020 | Ziaylek | E06C 5/06 |
| 10,894,497 | B2 * | 1/2021 | Urbanick | B66C 23/44 |
| 11,351,668 | B2 * | 6/2022 | Ziaylek | B25H 3/04 |
| 11,858,468 | B2 * | 1/2024 | Bouchard | B60P 3/1025 |
| 2011/0250041 | A1 * | 10/2011 | Wissler | B66F 11/00 414/539 |
| 2021/0354633 | A1 * | 11/2021 | Cowan | A47B 46/005 |

* cited by examiner

BRACKET SYSTEMS FOR STORING AND DEPLOYING ARTICLES OF EQUIPMENT

CROSS-REFERENCE TO RELATED APPLICATIONS

This application claims the benefit of U.S. provisional application No. 63/179,010, filed Apr. 23, 2021, the contents of which are incorporated by reference herein in their entirety.

BACKGROUND

Self-contained breathing apparatuses ("SCBAs") commonly are used by firefighters and other first responders to protect such individuals from the smoke, airborne carcinogens, and other airborne hazards often present in the environments within which first responders operate.

SCBAs commonly are stored and transported in the crew area of emergency vehicles. Due to concerns regarding possible exposure to carcinogens from the SCBAs themselves, however, there is a trend in the first-responder community to remove SCBAs from crew compartments, and to transport the SCBAs in unoccupied areas of the emergency vehicles.

A typical SCBA, however, is bulky, and the storage compartments on many emergency vehicles are limited in size. Also, the storage compartments on large emergency vehicles such as fire engines often are located above ground level. For example, the floor of a storage compartment on a typical fire engine may be five feet above ground level, necessitating the use of a ladder or step stool to access and deploy equipment stored in the compartment.

Thus, due to the limited volume and the elevated location of the storage compartments of many emergency vehicles, it may be difficult for first responders and other users to quickly and easily access and deploy SCBAs stored in such compartments. And these difficulties can be exacerbated by the low visibility and foul weather conditions, and the exigent circumstances under which first responders often must operate.

SUMMARY

In one aspect of the disclosed technology, a bracket system for storing and deploying an article of equipment includes at least one mounting bracket; and a tray mounted on the at least one mounting bracket and configured to translate linearly in relation to the at least mounting bracket between a first and a second position of the tray. The system also includes a backplate mounted on the tray and configured to support the article of equipment. The backplate is configured to rotate in relation to the tray between a first angular position at which the backplate has a first elevation in relation to the tray, and a second angular position at which the backplate has a second elevation in relation to the tray. The second elevation is lower than the first elevation.

In another aspect of the disclosed technology, the first angular position of the backplate is offset from the second angular position of the backplate by about 180 degrees.

In another aspect of the disclosed technology, the backplate is configured to rotate between the first and second angular positions of the backplate about an axis of rotation of the backplate. The axis of rotation of the backplate is approximately transverse to a lengthwise direction of the backplate; and the axis of rotation of the backplate is offset from a center of the backplate in the lengthwise direction of the backplate.

In another aspect of the disclosed technology, the at least one mounting bracket includes a first and a second mounting bracket; and the tray is positioned between the first and second mounting brackets when the tray is in the first position of the tray.

In another aspect of the disclosed technology, the tray overhangs the first and second mounting brackets when the tray is in the second position of the tray.

In another aspect of the disclosed technology, the backplate is further configured to translate linearly with the tray.

In another aspect of the disclosed technology, the system further includes a strap mounted on the backplate and configured to secure the article of equipment to backplate.

In another aspect of the disclosed technology, the system further includes a clip mounted on the backplate and configured to further secure the article of equipment to backplate.

In another aspect of the disclosed technology, the clip is formed from spring steel.

In another aspect of the disclosed technology, the system further includes a lever coupled to the at least one mount. The lever is configured to rotate in relation to the at least one mount between a first and a second angular position of the lever. The lever is further configured to prevent movement of the tray from the first to the second position of the tray when the lever is in the first angular position of the lever.

In another aspect of the disclosed technology, the system further includes at least one telescoping bracket connected to the tray and the at least one mount. The at least one telescoping bracket is configured to facilitate the movement of the tray between the first and second positions of the tray.

In another aspect of the disclosed technology, the at least one telescoping bracket has a load capacity of about 45 pounds.

In another aspect of the disclosed technology, the system further includes a lever coupled to the at least one mount. The lever is configured to rotate in relation to the at least one mount between a first and a second angular position of the lever. The lever is further configured to prevent extension of the at least one telescoping bracket when the lever is in the first angular position of the lever to thereby retain the tray in the first position of the tray.

In another aspect of the disclosed technology, the system further includes a backplate support member securely connected to the backplate; a cross member securely connected to the backplate support member; and at least one pin configured to rotatably couple the backplate support member to the at least one mount.

In another aspect of the disclosed technology, the system further includes a locking plate coupled to and spaced apart from the backplate support member; and a stop mounted on the tray. The locking plate is configured to move between a first and a second position in relation to the backplate support; and the locking plate is further configured to contact the stop when the locking plate is in the first position of the locking plate. The stop is configured to interfere with rotation of the backplane support member, and with rotation of the backplate from the first to the second angular position of the backplate, when the locking plate is in the first position of the locking plate.

In another aspect of the disclosed technology, the backplate is further configured to rotate from the first to the second angular position of the backplate when the locking plate is in the second position of the locking plate.

In another aspect of the disclosed technology, the backplate includes a plurality of through holes configured to accept respective fasteners configured to secure the strap and the clip to the backplate. The through holes are further configured to permit the strap and clip to be mounted at multiple location on the backplate.

In another aspect of the disclosed technology, the strap is a cam strap.

In another aspect of the disclosed technology, a method for storing and deploying an article of equipment includes providing a bracket system configured to hold the article of equipment, the bracket system including at least one mounting bracket; a tray mounted on the at least one mounting bracket and configured to translate linearly in relation to the mounting bracket between a first and a second position of the tray; and a backplate mounted on the tray and configured to support the article of equipment. The backplate is configured to rotate in relation to the tray between a first angular position at which the backplate has a first elevation in relation to the tray, and a second angular position at which the backplate has a second elevation in relation to the tray, the second elevation being lower than the first elevation.

The method also includes moving the tray from the first to the second position of the tray; and rotating the backplate from the first to the second angular position the backplate. The method further includes releasing a strap retaining the article of equipment on the backplate; and lifting the article of equipment from the backplate.

In another aspect of the disclosed technology, the article of equipment is a self-contained breathing apparatus.

DESCRIPTION OF THE DRAWINGS

The following drawings are illustrative of particular embodiments of the present disclosure and do not limit the scope of the present disclosure. The drawings are not to scale and are intended for use in conjunction with the explanations provided herein. Embodiments of the present disclosure will hereinafter be described in conjunction with the appended drawings.

DETAILED DESCRIPTION

Figure 1A:
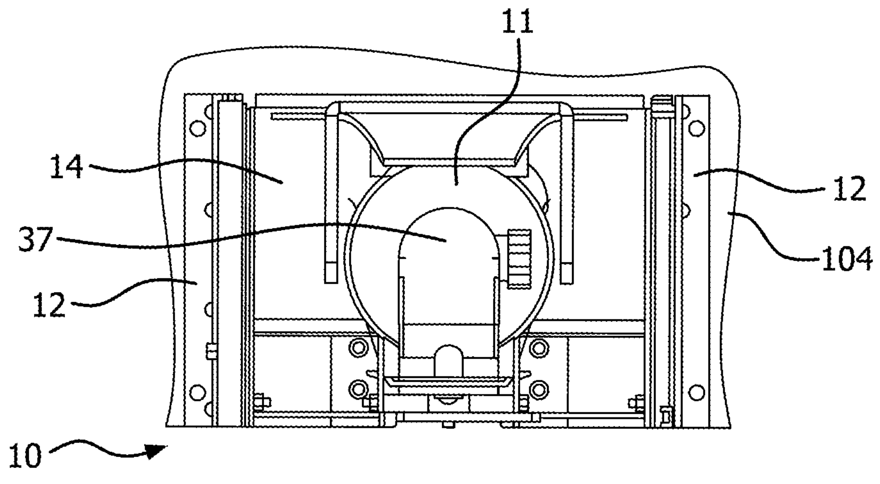
FIG. 1A is a top view of a bracket system and an SCBA mounted on the bracket system, showing a tray of the bracket system in a stowed position of the tray, and showing a backplate of the bracket system in a raised position of the backplate.

The inventive concepts are described with reference to the attached figures, wherein like reference numerals represent like parts and assemblies throughout the several views. The figures are not drawn to scale and are provided merely to illustrate the instant inventive concepts. The figures do not limit the scope of the present disclosure or the appended claims. Several aspects of the inventive concepts are described below with reference to example applications for illustration. It should be understood that numerous specific details, relationships, and methods are set forth to provide a full understanding of the inventive concepts. One having ordinary skill in the relevant art, however, will readily recognize that the inventive concepts can be practiced without one or more of the specific details or with other methods. In other instances, well-known structures or operation are not shown in detail to avoid obscuring the inventive concepts.

A bracket system 10 is provided for the storage and retrieval of an article of equipment such as a self-contained breathing apparatus (SCBA) 11 of the type used by firefighters and other first responders to provide breathing air during firefighting and other emergency operations. The use of the system 10 is disclosed in connection with the SCBA 11 for illustrative purposes only. The system 10 can be used to store and retrieve other types of cylindrical, and non-cylindrical articles of equipment.

The bracket system 10 comprises two mounting brackets 12, and a tray 14 mounted on the mounting brackets 12. The mounting brackets 12 are configured to be secured to a mounting surface 104, using fasteners or other suitable means. The mounting surface 104 can be, for example, a floor of a storage compartment 102 of a fire engine 100 shown in FIGS. 7A and 7B.

The use of the bracket system 10 in connection with the fire engine 100 is disclosed for illustrative purposes only. The bracket system 10 can be installed on other types of emergency vehicles, and on any type of vehicle having sufficient space inside or outside of the vehicle to accommodate the bracket system 10 and the article of equipment being stored thereon. The system 10 also can be used in non-vehicular applications, and can be installed, for example, in apparatus bays, closets, storage lockers, storage rooms, etc. If desired, multiple bracket systems 10 can be mounted next to each other in very close proximity, to facilitate the storage and retrieval of multiple SCBAs 11 and other equipment.

Figure 2B:
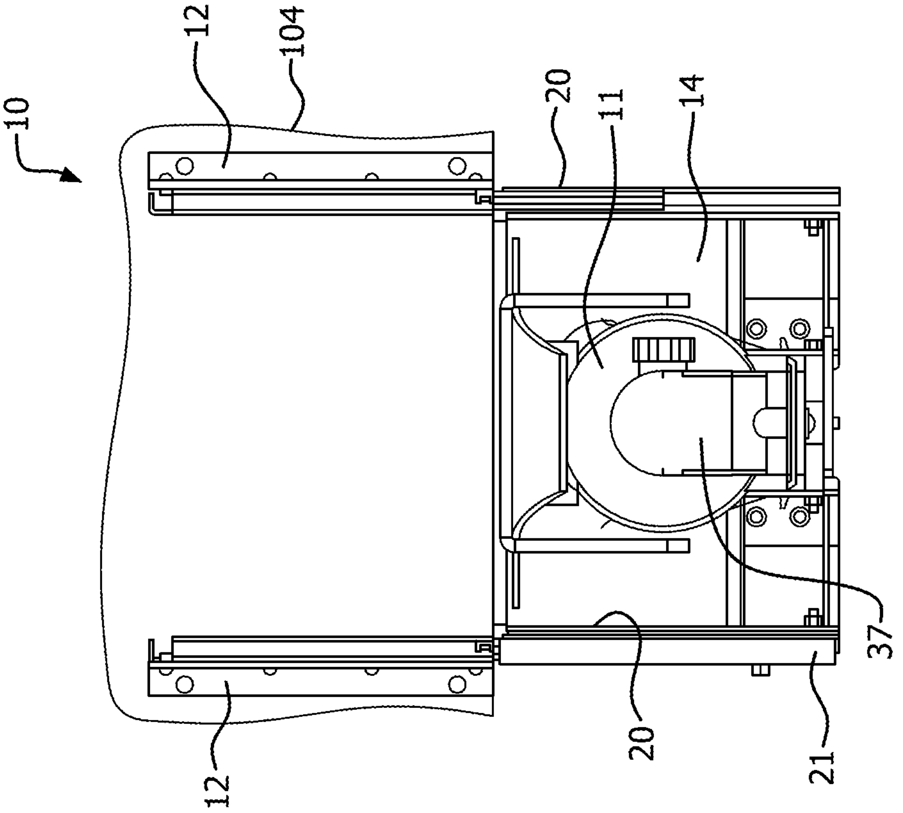
FIG. 2B is a top view of the bracket system and the SCBA shown in FIGS. 1A-2A, showing the tray in the semi-deployed position of the tray, and showing the backplate in the raised position of the backplate.
Figure 2A:
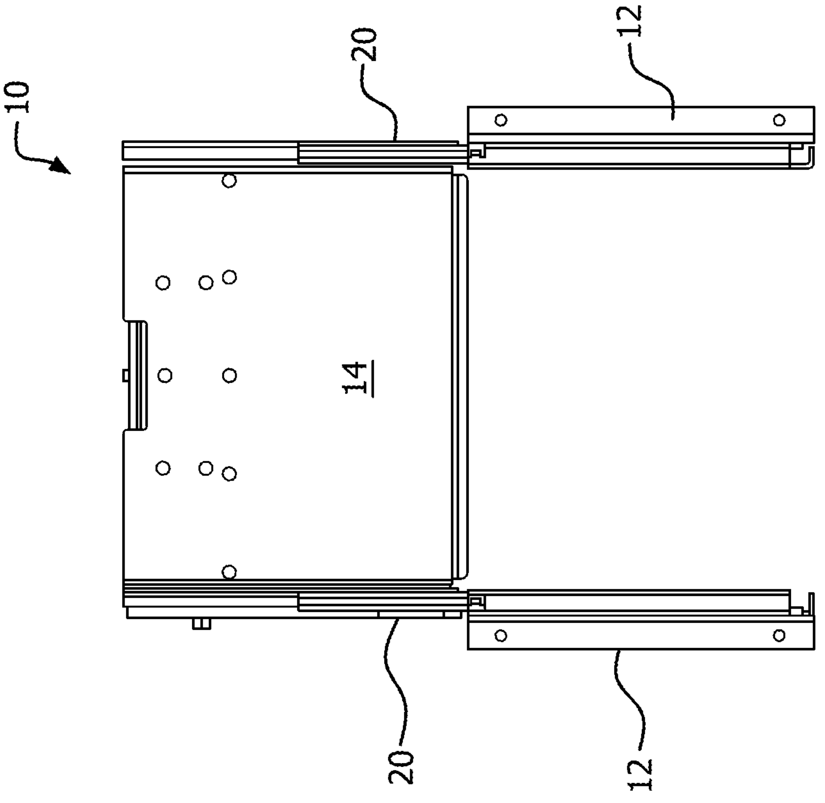
FIG. 2A is a bottom view of the bracket system shown in FIGS. 1A-1F, showing the tray in a semi-deployed position of the tray, and with the backplate in the raised position of the backplate.
Figure 2C:
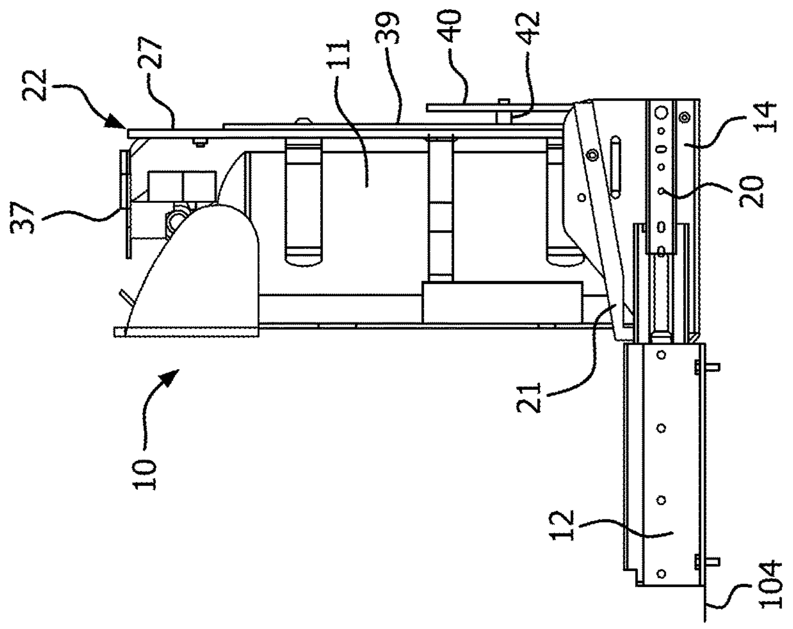
FIG. 2C is a left side view of the bracket system and the SCBA shown in FIGS. 1A-2B, showing the tray in the semi-deployed position of the tray, and showing the backplate in the raised position of the backplate.
Figure 2D:
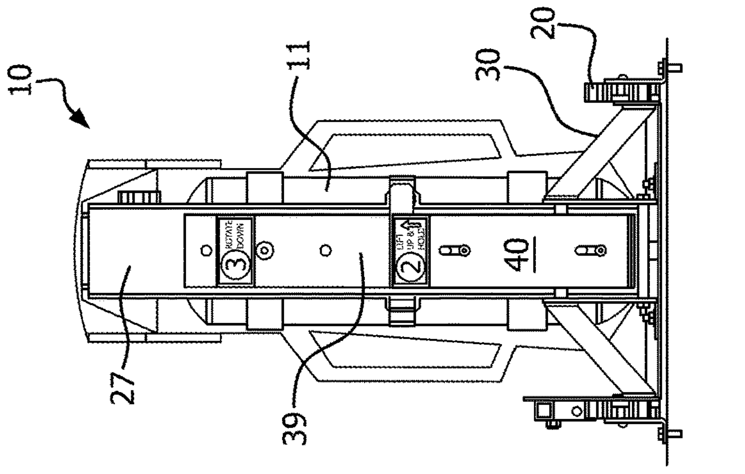
FIG. 2D is a front view of the bracket system and the SCBA shown in FIGS. 1A-2C, showing the tray in the semi-deployed position of the tray, and with the backplate in the raised position of the backplate.
Figure 2E:
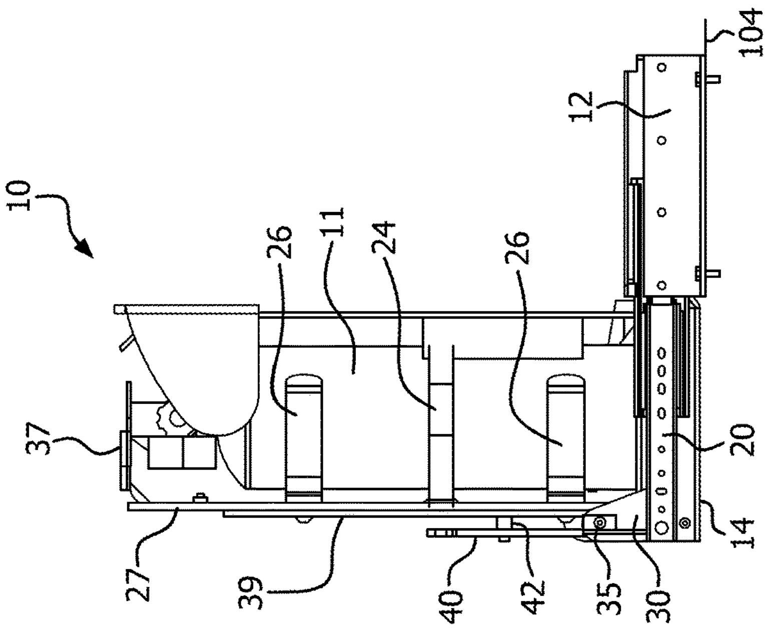
FIG. 2E is a right side view of the bracket system and the SCBA shown in FIGS. 1A-2D, showing the tray in the semi-deployed position of the tray, and showing the backplate in the raised position of the backplate.
Figure 6B:
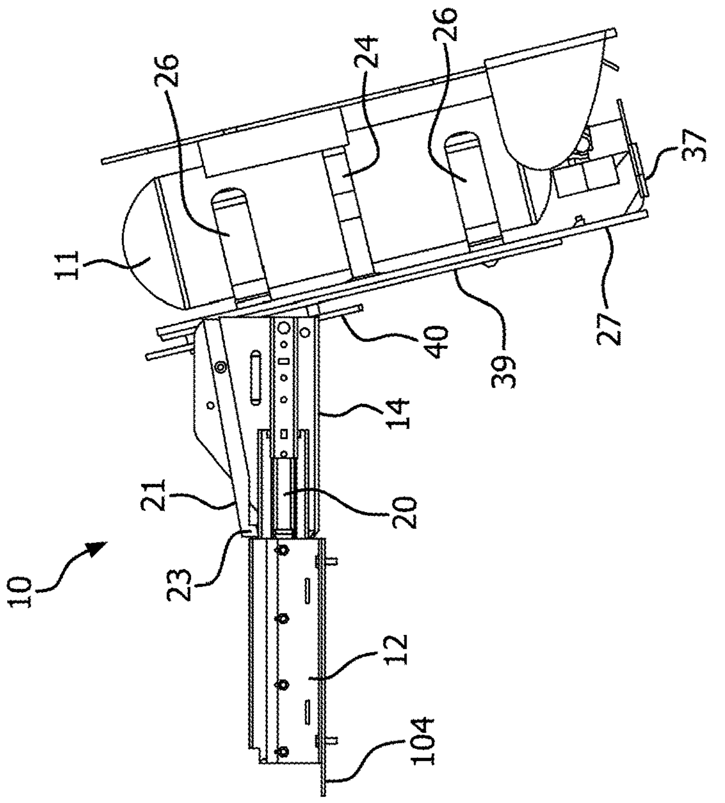
FIG. 6B is a left side view of the bracket system and the SCBA shown in FIGS. 1A-6A, showing the tray in the semi-deployed position of the tray, and showing the backplate in the lowered position of the backplate.
Figure 6A:
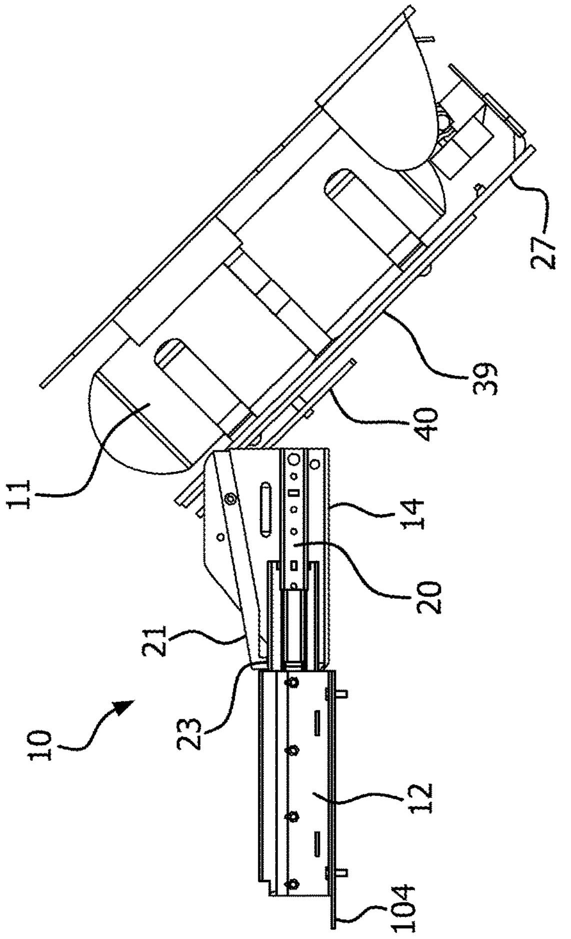
FIG. 6A is a left side view of the bracket system and the SCBA shown in FIGS. 1A-5B, showing the tray in the semi-deployed position of the tray, and showing the backplate moving between the stowed and lowered positions of the backplate.
Figure 7B:
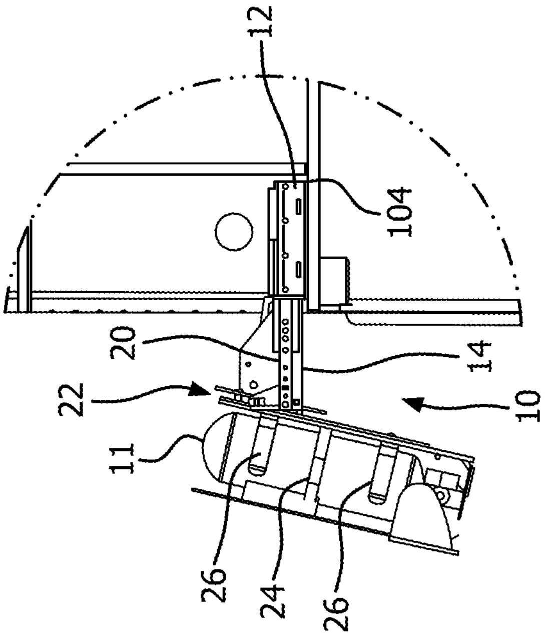
FIG. 7B is a magnified view of the area designated "C" in FIG. 7A.
Figure 7A:
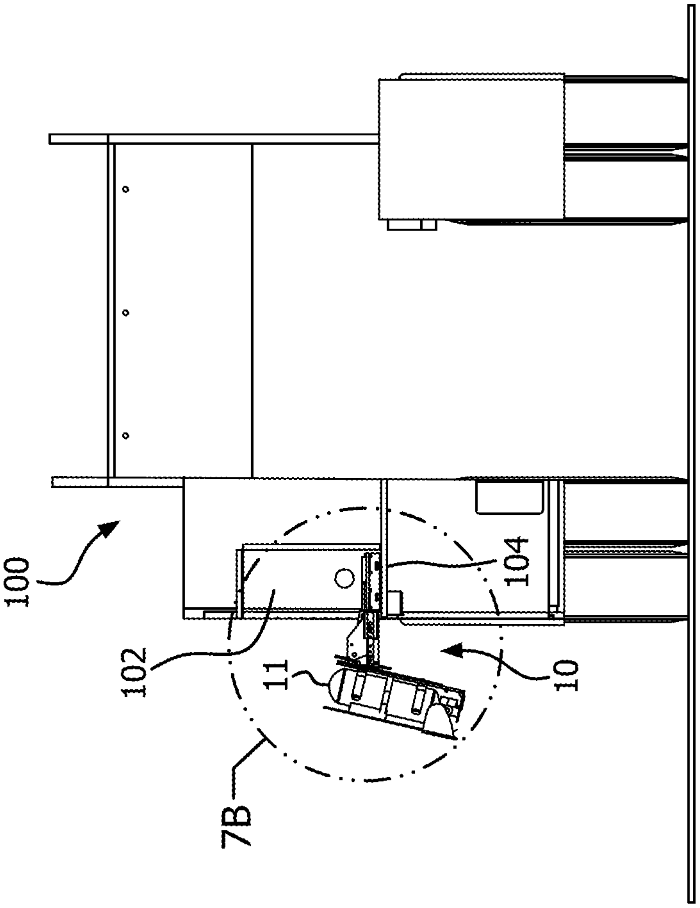
FIG. 7A is a left side view of the bracket system and the SCBA shown in FIGS. 1A-6B, showing the bracket system mounted on a fire truck, showing the tray in the semi-deployed position of the tray, and showing the backplate in the deployed position of the backplate.

The bracket system 10 securely stores the SCBA 11 in a stowed position in which the SCBA 11 has an upside down, or inverted orientation, facing the back of the storage compartment 102, i.e., facing away from a user standing adjacent to the storage compartment 102. The bracket system 10 is configured to articulate in a manner that positions the SCBA 11 in a lowered position at which the SCBA 11 has an upright orientation, facing the user, so that the user can retrieve the SCBA 11 quickly and easily. Because the bracket system 10 lowers the SCBA 11 as the SCBA 11 is retrieved, the user can retrieve the SCBA 11 from an elevated storage compartment without the need for a ladder or a step stool. This can be seen, for example, in FIGS. 2E and 6A-7B. FIG. 2E. These figures show the SCBA 11 in its stowed position at which the SCBA 11 faces rearward, and is in an inverted orientation. FIGS. 6B, 7A, and 7B depict the SCBA 11 in its lowered position at which the SCBA 11 faces forward, i.e., toward the user; overhangs the adjacent edge of the mounting surface 104; and is in upright orientation ready to be retrieved by the user. FIG. 6A depicts the SCBA 11 moving between the stowed and lowered positions.

The bracket system 10 allows the SCBA 11 to be stored in areas of the fire engine 100 apart from the crew area. In one possible application, the bracket system 10 can be used to store one SCBA 11 in a minimally-sized sized storage compartment on the fire engine 100. Since a typical height of such compartments may be about five feet from the ground level, the bracket system 10 allows SCBA 11 to be stored in such a compartment, and to be accessed and retrieved by a user at ground level without a ladder or step stool, and in a manner that permits the user to quickly and easily don the SCBA 11.

The tray 14 is configured to move in relation the mounting brackets 12, between a first, or stowed position shown in FIGS. 1A-1F and 4A-5B, and a second, or semi-deployed position shown in FIGS. 2A-3B and 6A-7B. The tray 14 is supported by two telescoping brackets 20. The brackets 20, in turn, are mounted on the respective mounting brackets 12 which, as noted above, are secured to the mounting surface 104 of the fire truck 100. The telescoping brackets 20 configured to permit the tray 14 to extend away from the mounting brackets 12 to its semi-deployed position, and to retract into its stowed position between the mounting brackets 12. When the tray 14 is in its stowed position, the bracket system 10 has a relatively compact footprint completely within the storage compartment 102. When in the semi-deployed position, the tray 14 can extend past the edge of the mounting surface 104 as shown in FIGS. 6B, 7A, and 7B, so that the SCBA 11 can be flipped and lowered by the user while remaining clear of, and without damaging any adjacent components or structure of the fire engine 100, such as drip edges or wheel well trim.

Each bracket 20 can have a load capacity of, for example, about 45 pounds. The brackets 20 can have other load capacities in alternative embodiments.

Figure 1B:
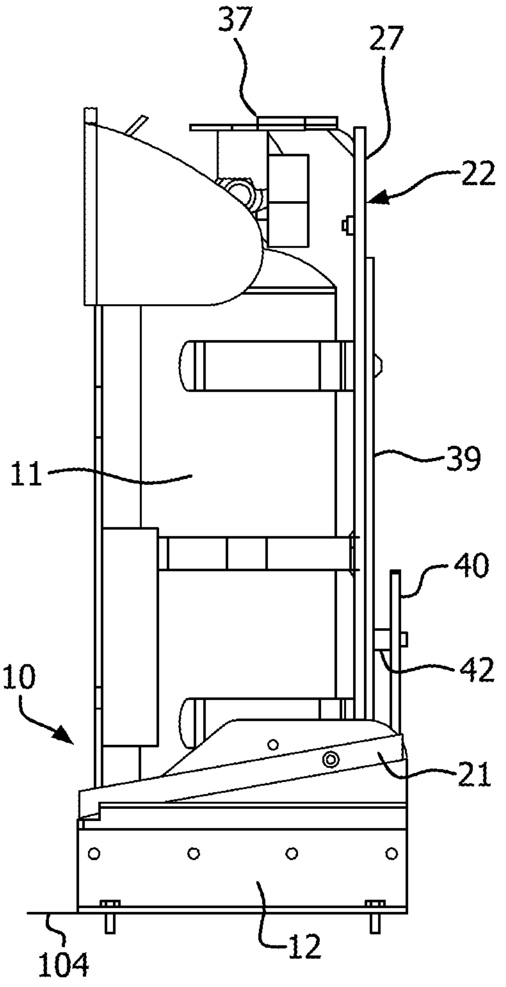
FIG. 1B is a left side view of the bracket system and the SCBA shown in FIG. 1A, showing the tray in the stowed position of the tray, and showing the backplate in the raised position of the backplate.
Figure 1C:
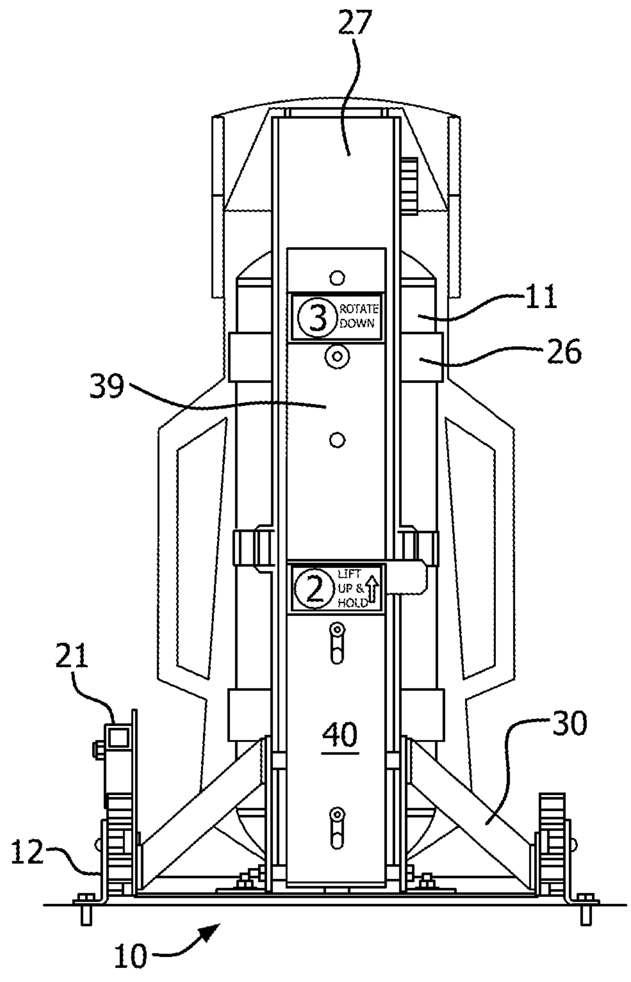
FIG. 1C is a front view of the bracket system and the SCBA shown in FIGS. 1A and 1B, showing the tray in the stowed position of the tray, and with the backplate in the raised position of the backplate.
Figure 1D:
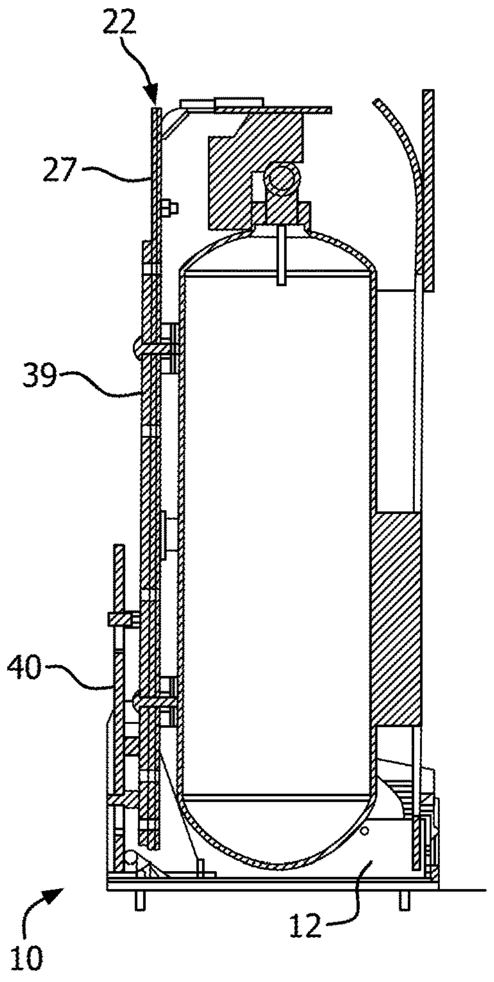
FIG. 1D is a cross-sectional view of the bracket system and the SCBA shown in FIGS. 1A-1C, showing the tray in the stowed position of the tray, and with the backplate in the raised position of the backplate, taken through the line "A-A" of FIG. 1C.
Figure 1E:
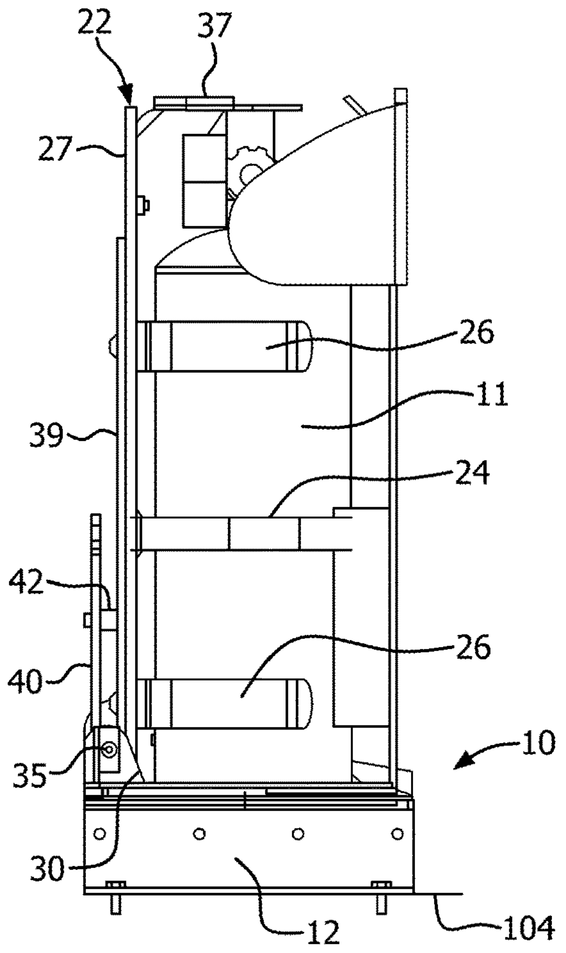
FIG. 1E is a right side view of the bracket system and the SCBA shown in FIGS. 1A-1D, showing the tray in the stowed position of the tray, and showing the backplate in the raised position of the backplate.
Figure 1F:
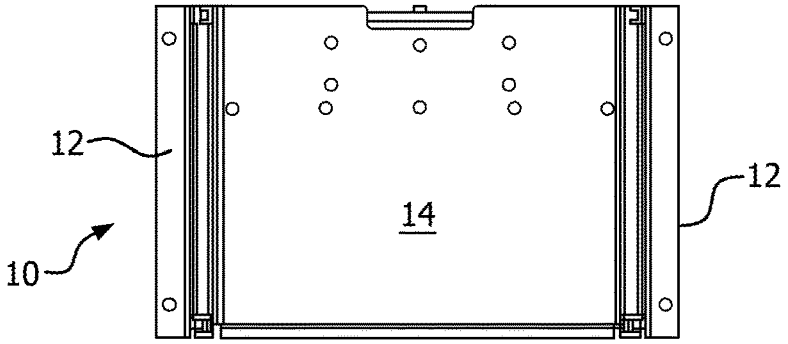
FIG. 1F is a bottom view of the bracket system shown in FIGS. 1A-1E, showing the tray in the stowed position of the tray, and with the backplate in the raised position of the backplate.
Figure 3A:
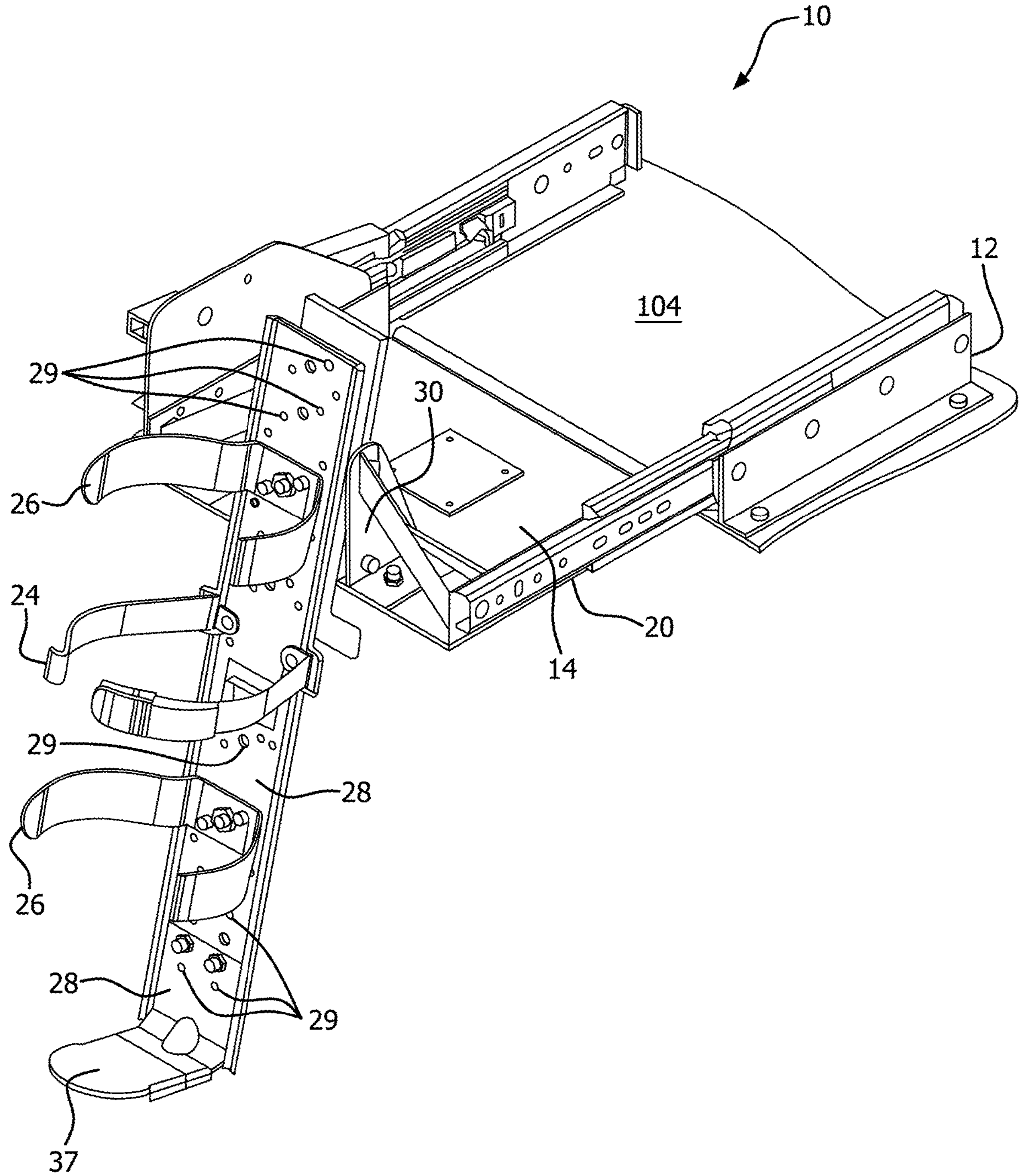
FIG. 3A is a top-front perspective view of the bracket system shown in FIGS. 1A-2E, with the SCBA removed, showing the tray in the semi-deployed position of the tray, and showing the backplate in a lowered position of the backplate.
Figure 3B:
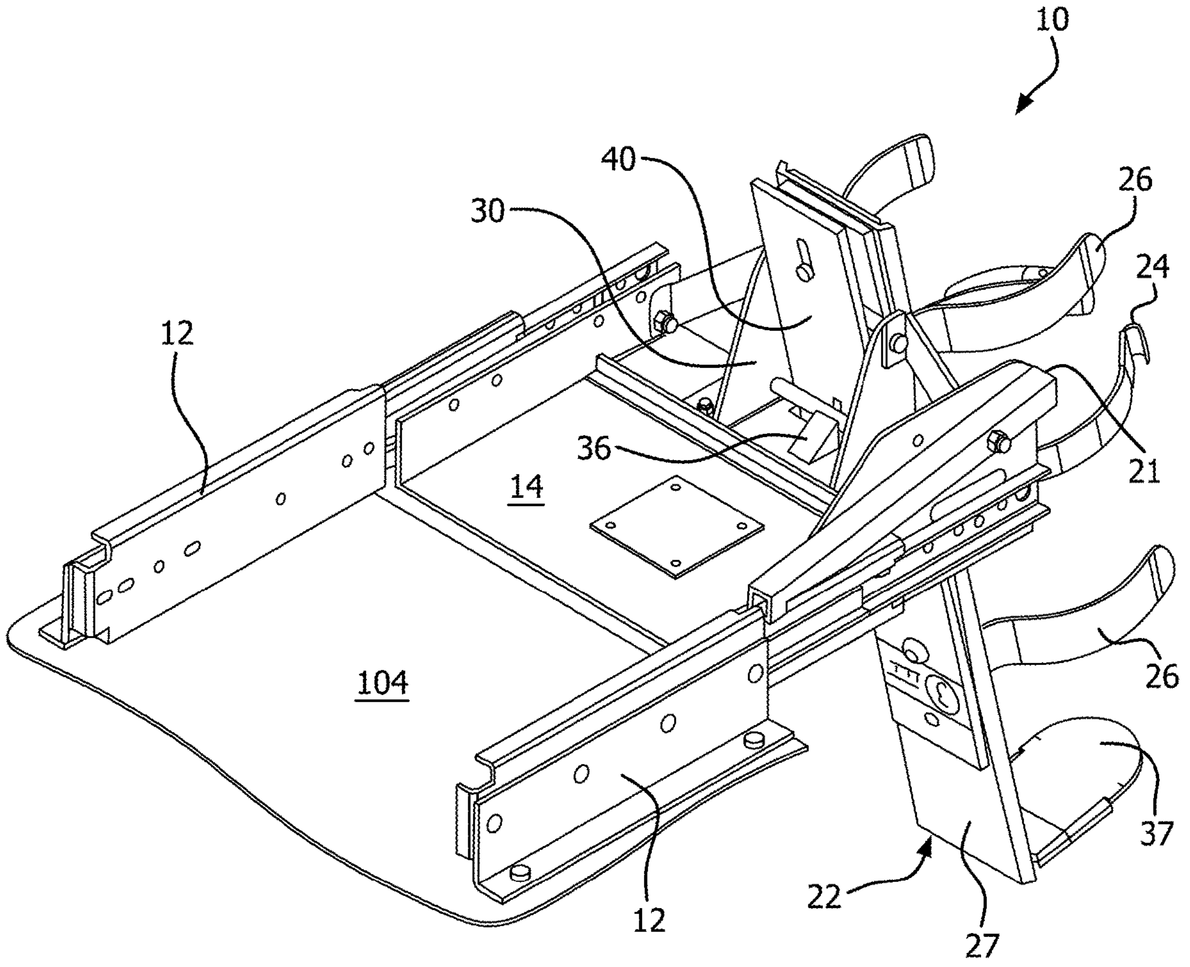
FIG. 3B is a top-rear perspective view of the bracket system shown in FIGS. 1A-3A, with the SCBA removed, showing the tray in the semi-deployed position, and showing the backplate in the lowered position of the backplate.
Figure 4A:
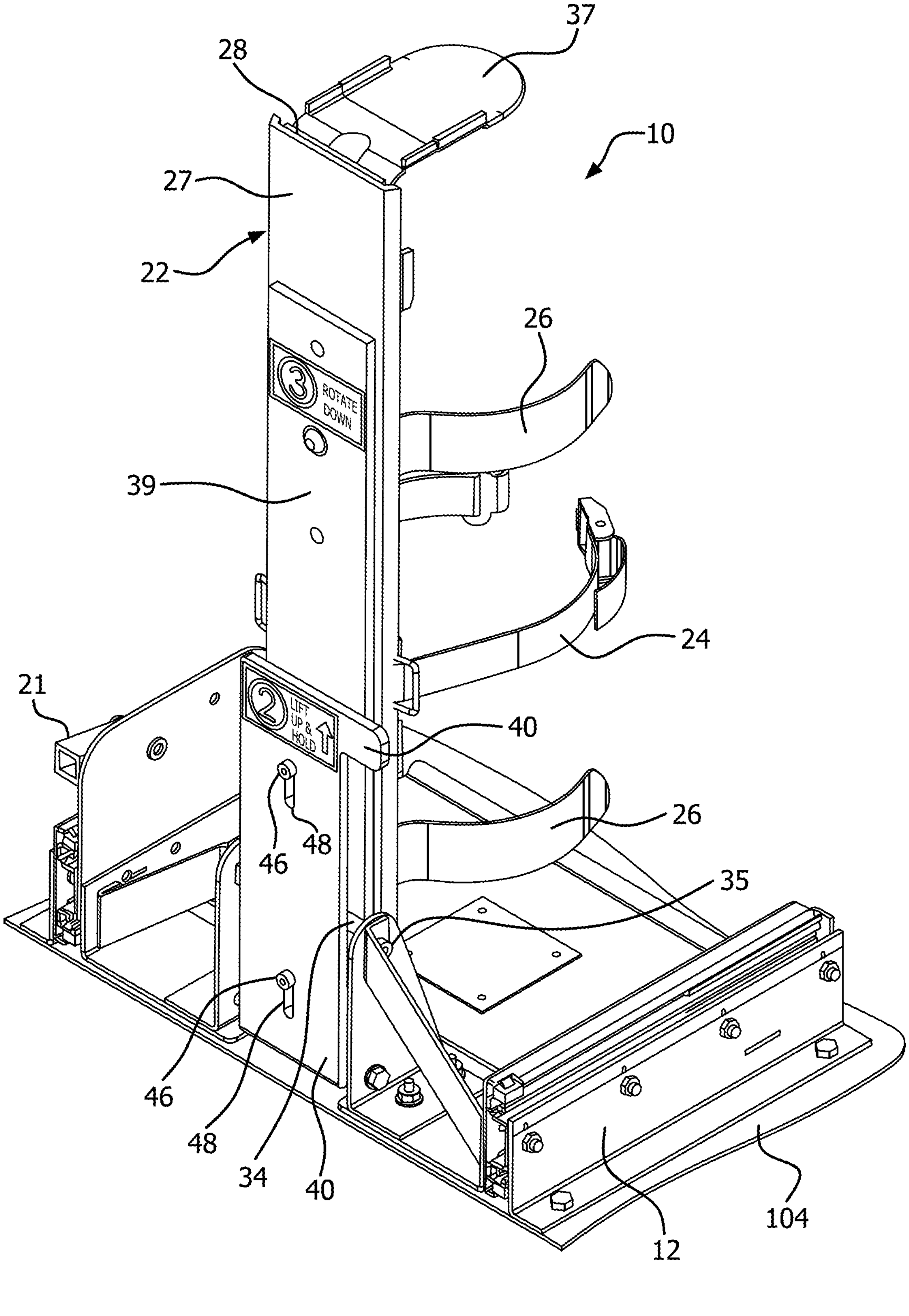
FIG. 4A is a top-front perspective view of the bracket system shown in FIGS. 1A-3B, with the SCBA removed, showing the tray in the stowed position of the tray, and showing the backplate in the raised position of the backplate.
Figure 4B:
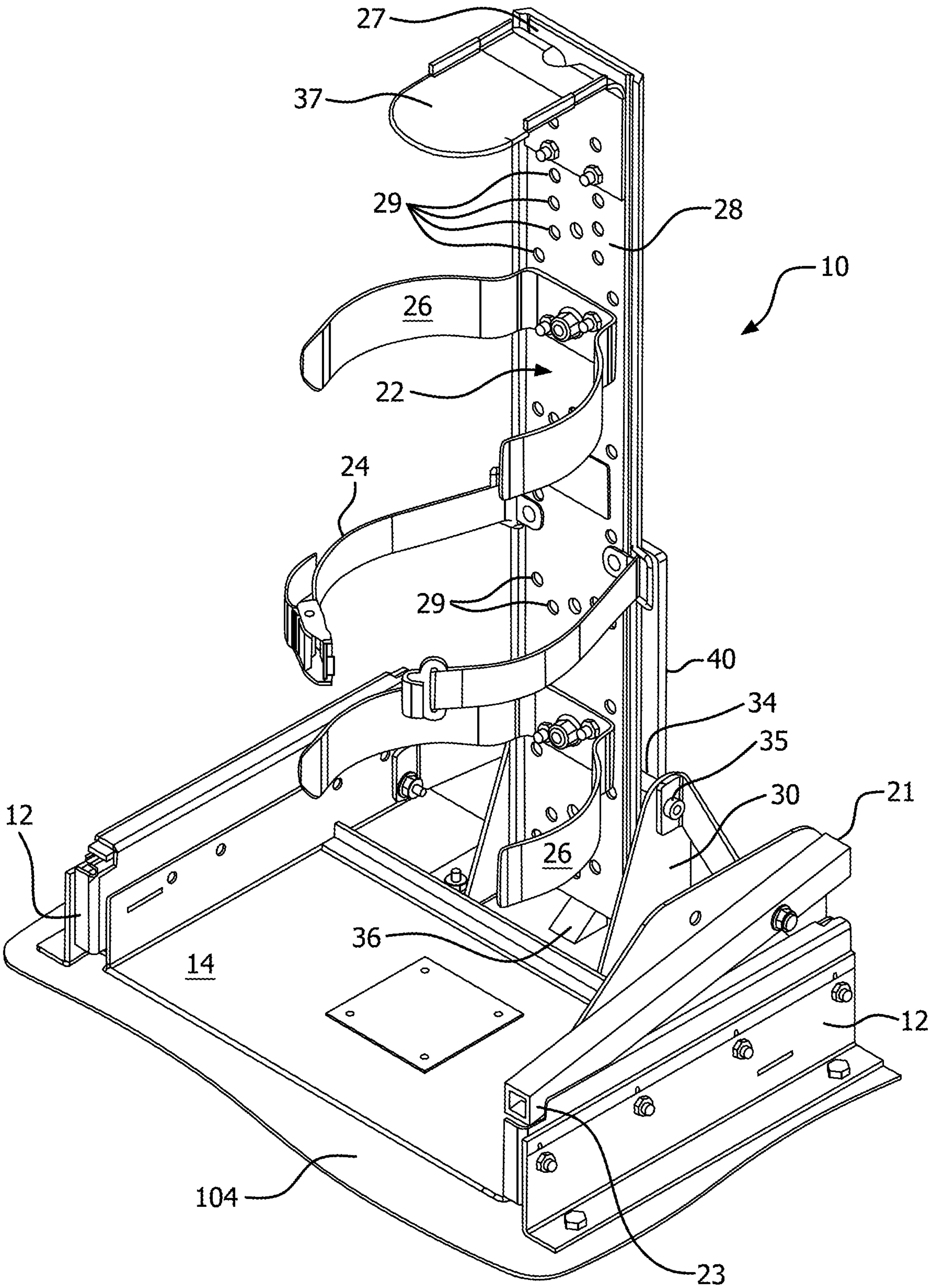
FIG. 4B is a top-rear perspective view of the bracket system shown in FIGS. 1A-4A, with the SCBA removed, showing the tray in the stowed position of the tray, and showing the backplate in the raised position of the backplate.
Figure 5A:
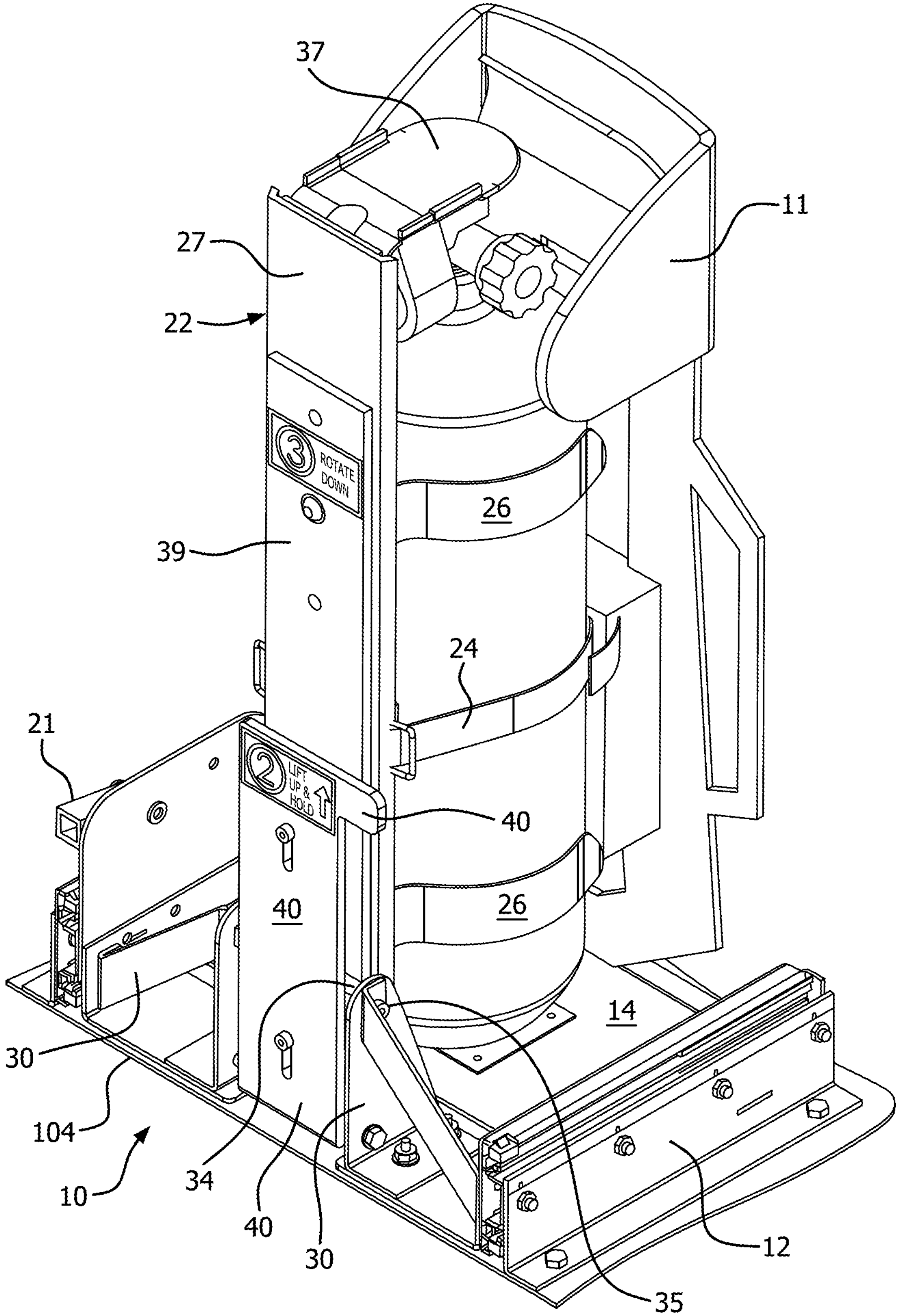
FIG. 5A is a top-front perspective view of the bracket system and the SCBA shown in FIGS. 1A-4B, showing the tray in the stowed position of the tray, and showing the backplate in the raised position of the backplate.
Figure 5B:
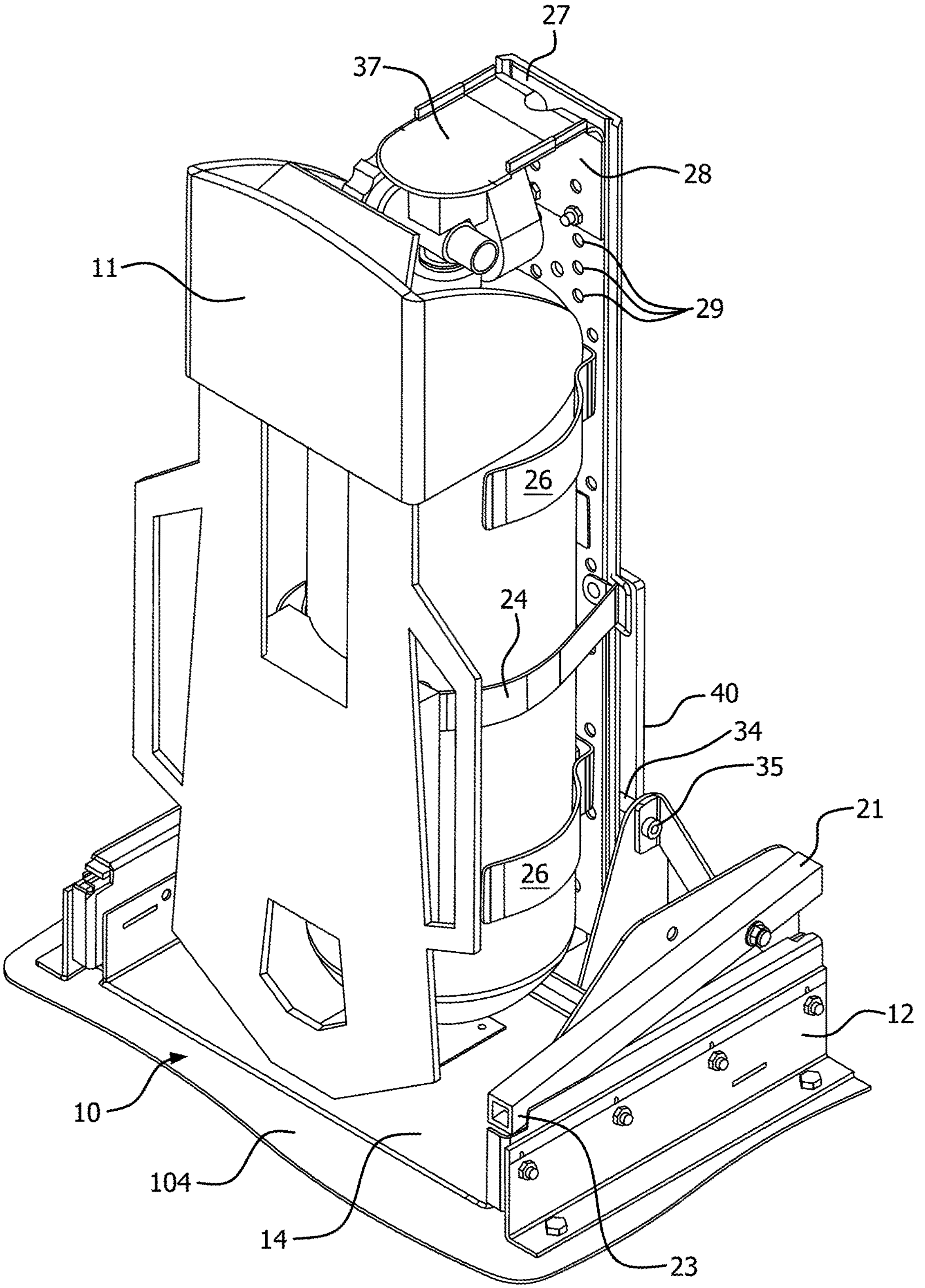
FIG. 5B is a top-rear perspective view of the bracket system and the SCBA shown in FIGS. 1A-5A, showing the tray in the stowed position of the tray, and showing the backplate in the raised position of the backplate.

The bracket system 10 also includes a locking lever 21. The locking lever 21 is mounted on one of the mounting brackets 12 by way of a pin that permits the locking lever 21 to rotate in relation to the mounting bracket 12, between a first angular position, or locking position shown, for example, in FIGS. 1B, 2C, 3B, 4B, and 5B-6B; and a second angular position, or releasing position (not shown). The locking lever 21 is configured to engage a forward edge of the associated bracket 20 when the locking lever 21 is in its locking position and the tray 14 is in its stowed position, as shown in FIGS. 1B, 4B, and 5B. Interference between a lip 23 formed on the locking lever 21 and the forward edge of the bracket 20 prevents the bracket 20 from extending, thereby locking the tray 14 in its stowed position. The locking lever 21 can be biased toward its locking position by a spring (not shown) or other suitable means.

The locking lever 21 does not interfere with the extension of the bracket 20 when the locking lever 21 is in the releasing position. When the user wishes to retrieve the SCBA 11 from the bracket system 10, the user presses downward on one end of the locking lever to rotate the locking lever 21 in a clockwise direction, from the perspective of FIG. 1B, to its releasing position. The uses then can pull the tray 14 outward, from its stowed position to its semi-deployed position. As can be seen in FIG. 1B, the user's hand and fingers will be positioned safely away from the path of travel of the tray 14 when the user presses on the end of the locking lever 21.

As can be seen in FIGS. 2C, 3B, 6A, and 6B, the locking lever 21 returns it is locking position when the tray 14 reaches the semi-deployed position. Interference between the forward edge of the locking lever 21 and the corresponding mounting bracket 12 prevents the tray 14 from returning to its stowed position, thus avoiding the potential for damage to the adjacent surfaces of the fire engine 100 (or other object), and injury to the user, caused by movement of the tray 14 to its stowed position after the SCBA 11 has been flipped to its lowered position shown in FIGS. 6B-7A. When the user wishes to return the tray 14 to its stowed position (after the SCBA 11 has been returned to its stowed position), the user can rotate the locking lever 21 to its releasing position so that the locking lever 21 no longer interferes with the inward movement of the bracket 20.

In alternative embodiments, a gravity-actuated pin can be used in lieu of the locking lever 21. The pin can be configured to move vertically between a lower position at which the pin contacts the forward edge of one of the brackets 20 or the platform 14 to prevent the bracket 20 or the platform 14 from extending outward, and an upper position at which the pin does not interfere with the outward extension of the bracket 20 or the platform 14. Optionally, a spring can be used to bias the pin in the downward direction.

Referring to FIGS. 4A-5B, the bracket system 10 also includes a backplate 22, a strap 24, and two clips 26. The strap 24 and the clips 26 are mounted on the backplate 22, and are configured to securely retain the SCBA 11 on the backplate 22. In addition, the strap 24 can be wrapped around the various pressure lines and pack straps of the SCBA 11 so that those components of the SCBA 11 do not interfere with the sliding and flipping movements of the bracket system 10.

As discussed below, the backplate 22 is coupled to the tray 14 so that the backplate 22 can rotate in relation to the tray 14 between a first angular position, or raised position shown in FIGS. 1A-2E and 4A-5B; and a second angular position, or lowered position shown in FIGS. 3A, 3B, and 6B-7B. As can be seen in these figures, when the backplate 22 is in its raised position, the attached SCBA 11 assumes its inverted stowed position. When the backplate 22 is in its lowered position, the SCBA 11 assumes its upright lowered position.

Referring to FIGS. 3A-4B, the backplate 22 has an outer portion 27, and an inner portion 28 secured to the outer portion 27 by a suitable means such as fasteners. The inner portion 28 has a plurality of through holes 29 formed therein. The through holes 29 receive fasteners that secure the strap 24 and the clips 26 to the backplate 22. As can be seen in FIG. 4B, the through holes 29 are positioned at various location along the length of the inner portion 28, so that the positions of the strap 24 and the clips 26 on the backplate 22 can be varied to accommodate SCBAs 11 and other articles of equipment of various sizes and shapes. The number and locations of the through holes 29 also permit the clips 26 to be changed-out quickly and easily, further allowing the bracket system 10 to accommodate SCBAs 11 and other articles of equipment of various sizes and shapes.

The strap 24 is equipped with a buckle that permits the user to quickly release the SCBA 11 from the backplate 22 so that the user can retrieve the SCBA 11 from the backplate 22 with minimal time and effort. In alternative embodiments, the bracket system 10 can include more than one strap 24. In other alternative embodiments, the strap 24 (or straps 24) can be a cam strap, to facilitate quicker and easier cinching of the strap around the SCBA 11.

The clips 26 are sized to receive the SCBA 11. The clips 26 can be formed from spring steel or another suitable material that resiliently deflects when the SCBA 11 is received by the clips 26, so that the clips 26 hold the SCBA 11 in place until the SCBA 11 is secured by the strap 24. Alternative embodiments of the backet system 10 can include more, or less than two clips 26. The clips 26 can be coated with a cycle tested, durable high-cycle coating to protect the cylinder of the SCBA 11 from wear or other damage caused by contact with the clips 26.

Referring to FIGS. 4A-5B, the bracket system 10 also includes an upper support member 37. The upper support member 37 is mounted on the upper end of the inner member 28 of the backplate 22, from the perspective of FIGS. 4A-5B. The upper support member 37 is configured to support the SCBA 11 when the SCBA 11 is in an inverted orientation as shown in FIGS. 6B-7B. As discussed below, the SCBA 11 assumes this orientation when the backplate 22 is rotated to a lowered position at which the SCBA 11 can be removed easily from the bracket system 10. The upper support member 37 can be coated with a cycle tested, durable high-cycle coating to protect the contacting surfaces of the SCBA 11 from wear or other damage caused by contact with the upper support member 37.

As noted above, the backplate 22 is mounted on the tray 14, and is configured to rotate in relation to the tray 14 between a first angular position, or raised position shown in FIGS. 1A-2E and 4A-5B; and a second angular position, or lowered position shown in FIGS. 3A, 3B, and 6B-7B. In particular, the bracket system 10 further includes two brackets 30 secured to the tray 14 by a suitable means such as fasteners; a backplate support member 39; and a cross member 34. The backplate support member 39 is secured to the backplate 22 by a suitable means such as fasteners. Referring 8B, the cross member 34 is secured to the backplate support member 39, on the opposite side of the backplate support member 39 from the backplate 22, by a suitable means such as welding.

Referring to FIGS. 4A-5B, 8A, and 8B, the cross member 34 is connected to the brackets 30 by pins 35. The pins 35 facilitate rotation of the cross member 34 in relation to the brackets 30, so that the backplate 22 can rotate with the cross member 34 and the backplate support member 39, between the raised and lowered positions of the backplate 22. The stop 36 is securely mounted on the upper surface of the tray 14, as can be seen in FIGS. 3B and 4B, and prevents the backplate 22 from rotating past its raised position.

Figure 8B:
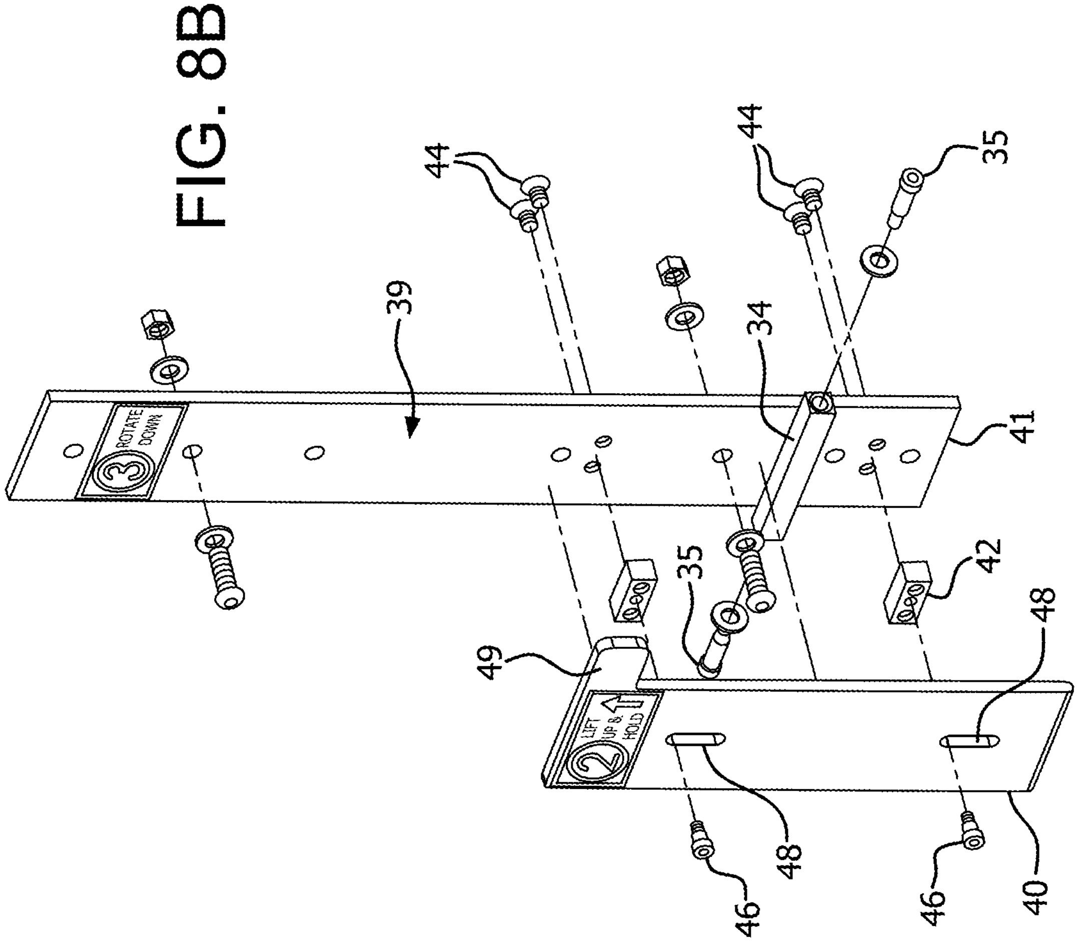
FIG. 8B is an exploded view of the locking plate and the backplate support shown in FIG. 8A.

The cross member 34 is secured to the backplate support member 39 proximate a first end 41 of the backplate support member 39, as can be seen in FIG. 8B. The first end 41 of the backplate support member 39 is the lower end of the backplate support member 39 when the backplate 22 is in its raised position. Thus, the axis of rotation of the backplate support member 39 is located proximate the first end 41 of the backplate support member 39, and is offset downwardly from the lengthwise center of the backplate support member 39, when the backplate 22 is in its raised position. The axis of rotation of the attached backplate 22 likewise is located proximate the lower end of the backplate 22 and is offset downwardly from the lengthwise center of the backplate 22, when the backplate 22 is in its raised position. This offset in the axis of rotation of the backplate 22 causes the backplate 22 to descend, and to assume a lower elevation as the backplate 22 is rotated from its raised position to its lowered position, as can be seen in FIGS. 2C, 2E, and 6A-7B. The descending movement positions the SCBA 11 at a height at which a user easily can retrieve the SCBA 11 from ground level. Also, the rotation of the backplate 22 causes the SCBA 11 to reverse direction so that it faces outward, toward the user, once the backplate 22 reaches its lowered position.

The backplate 22 and the backplate support member 39 are sized and otherwise configured to withstand the loads that occur within those components when the attached SCBA 11 is flipped and lowered during the retrieval process.

Referring to FIG. 8B, the bracket system 10 also includes a locking plate 40, and two spacers 42. The spacers 42 are secured to the backplate support member 39, on an opposite side of the backplate support member 39 from the backplate 22, by fasteners 44. The locking plate 40 is coupled to the spacers 42 by two fasteners 46. The fasteners 46 are disposed, in part, within respective slots 48 formed in the locking plate 40. The slots 48 facilitate translation of the locking plate 40 in relation to the spacers 42 and the backplate support member 39 in a generally vertical direction, between a first, or locking position shown, for example, in FIGS. 1C, 2D, 4A, and 5A; and a second, or released position (not shown).

The slots 48 and the locking plate 40 are configured so that the locking plate 40 rests in its locking position when the backplate 22 is in its raised position. The locking plate 40 remains in its locking position due to gravity. In alternative embodiments, the locking plate 40 can be biased toward is locking position by a spring, to further reduce the potential for accidental or otherwise unintended rotation of the backplate 22, the backplate support member 39, and the SCBA 11.

As can be seen in FIGS. 1C, 2D, 4A, and 5A, the fasteners 46 are located at or near the tops of the respective slots 48, and a lower end of the locking plate 40 rests on, or near the adjacent surface of the tray 14, adjacent the stop 36, when the locking plate 40 is in its locking position. Thus, any attempt by the user to rotate the bracket 22 away from its raised position and toward its lowered position under this condition will result in interference between the locking plate 40 and the stop 36. This interference prevents rotation of the bracket 22 toward its lowered position, thus securing the bracket 22 in its raised position.

Figure 8A:
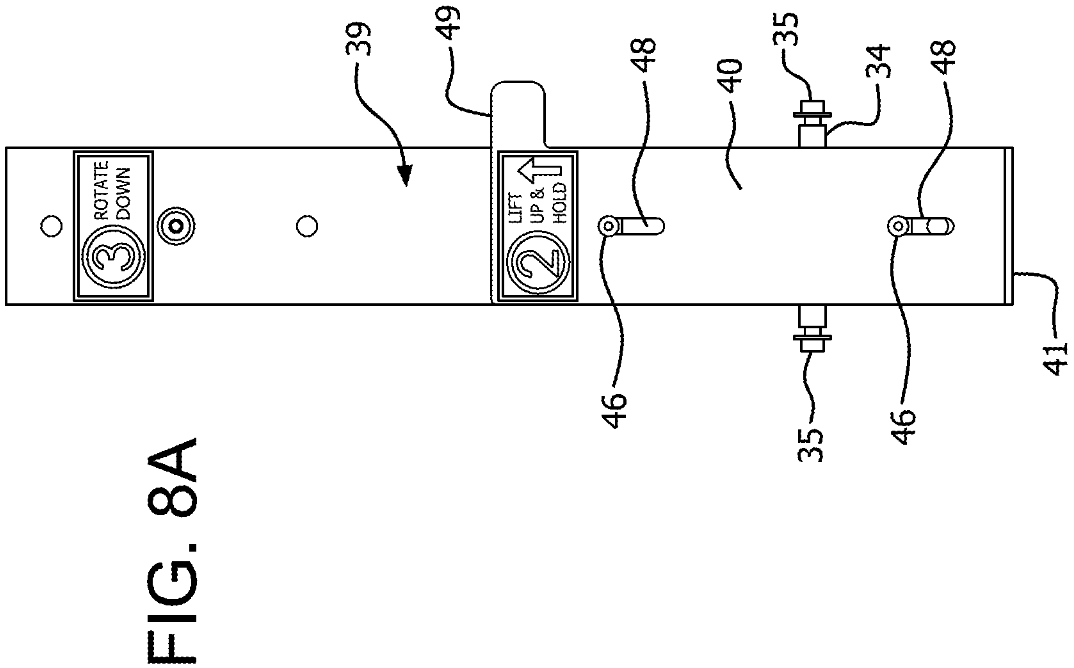
FIG. 8A is a front view of a locking plate and a backplate support of the bracket system shown in FIGS. 1A-7B, showing the locking plate in a locking position of the locking plate.

The user can rotate the backplate 22 to its lowered position by lifting the locking plate 40 to its released position. As can be seen in FIGS. 8A and 8B, the locking plate 40 has a tab 49 located at the upper end thereof. The user can lift the locking plate 40 using the tab 49, so that the user's hand and fingers remain safely out of the way of any other moving parts.

When the locking plate 40 is in the released position, the bottom edge of the locking plate 40 is higher than the top of the stop 36. Thus, the stop 36 no longer interferes with to rotation of the backplate 22, and the backplate 22 can be rotated to its lowered position. When the backplate 22 subsequently is returned to its raised position, the angled upper surface of the stop 36 urges the locking plate 40 upward so that the locking plate 40 can clear the stop 36, after which the locking plate 40 returns to its locking position due the gravity.

Alternative embodiments of the bracket system 109 can be equipped with one or more dampers that dampen or slow the rotation of the backplate 22 as the backplate 22, with the attached SCBA 11, translates to its lowered position. The dampers can be, for example, rotational dampers, with each damper coupled to a respective bracket 30 and its corresponding pin 35. Other types of dampers, mounted at other locations on the bracket system 10, can be used in other alternative embodiments.

In use, the SCBA 11 can be securely stored on the bracket system 10 within, for example, the storage compartment 102 of the fire engine 100. When in the stored condition, i.e., when in its stowed position, the SCBA 11 is upside down, or inverted, and faces toward the inside of the storage compartment 102. The backplate 22, with the attached SCBA 11, is secured in its raised position by the locking plate 40 and the stop 36; and the tray 14 is secured in its stowed position by the locking lever 21.

When a user wishes to retrieve the SCBA 11, the user moves the locking lever 21 to its released position, and then pulls the tray 14 outward, away from the storage compartment 102 and into its semi-deployed position. The user then lifts the locking plate 40 and pulls the backplate 22 outward and downward to rotate the backplate 22 from its raised position to its lowered position, as can be seen in FIGS. 7A and 7B. At this point, the SCBA 11 is in its lowered position, is upright and faces outward, and is at an elevation at which the SCBA 11 can be accessed easily from ground level. The user then releases the buckle on the strap 24, and lifts the SCBA 11 off of the backplate 22.

Thus, the user can quickly retrieve the SCBA 11 from its secure position within the elevated compartment 102. The user can perform the entire retrieval process from ground level, and can safely and easily release the interlocks that secure the tray 14 and the backplate 22 in their proper relative positions before and during the various phases of the retrieval process. The retrieval process can be performed easily under low visibility and adverse weather conditions, and without the need for any keys or tooling. The bracket system 10 thus facilitates stowage of the SCBA 11 outside of the crew compartment of the fire engine 100, while allowing quick and easy access to, and deployment of the SCBA 11 once the fire engine 100 (or other vehicle) arrives at its destination.

We claim:

1. A bracket system for storing and deploying an article of equipment, comprising:
- at least one mounting bracket;
- a tray mounted on the at least one mounting bracket and configured to translate linearly in relation to the at least one mounting bracket between a first and a second position of the tray; and
- a backplate mounted on the tray and configured to support the article of equipment; wherein:
  - the backplate is configured to rotate in relation to the tray between a first angular position at which the backplate has a first elevation in relation to the tray, and a second angular position at which the backplate has a second elevation in relation to the tray;
  - the second elevation is lower than the first elevation; and
  - the first angular position of the backplate is offset from the second angular position of the backplate by about 180 degrees.

2. A bracket system for storing and deploying an article of equipment, comprising:
- at least one mounting bracket;
- a tray mounted on the at least one mounting bracket and configured to translate linearly in relation to the at least one mounting bracket between a first and a second position of the tray;
- a backplate mounted on the tray and configured to support the article of equipment; and
- a strap mounted on the backplate and configured to secure the article of equipment to backplate, wherein:
  - the backplate is configured to rotate in relation to the tray between a first angular position at which the backplate has a first elevation in relation to the tray, and a second angular position at which the backplate has a second elevation in relation to the tray; and the second elevation is lower than the first elevation.

3. The bracket system of claim 2, wherein:

the backplate is configured to rotate between the first and second angular positions of the backplate about an axis of rotation of the backplate;

the axis of rotation of the backplate is approximately transverse to a lengthwise direction of the backplate; and the axis of rotation of the backplate is offset from a center of the backplate in the lengthwise direction of the backplate.

4. The bracket system of claim 2, wherein:

the at least one mounting bracket comprises a first and a second mounting bracket; and the tray is positioned between the first and second mounting brackets when the tray is in the first position of the tray.

5. The bracket system of claim 4, wherein the tray overhangs the first and second mounting brackets when the tray is in the second position of the tray.

6. The bracket system of claim 2, wherein the backplate is further configured to translate linearly with the tray.

7. The bracket system of claim 2, further comprising a clip mounted on the backplate and configured to further secure the article of equipment to backplate.

8. The bracket system of claim 7, wherein the clip comprises spring steel.

9. The bracket system of claim 7, wherein the backplate comprises a plurality of through holes configured to accept respective fasteners configured to secure the strap and the clip to the backplate, wherein through holes are further configured to permit the strap and clip to be mounted at multiple location on the backplate.

10. The bracket system of claim 2, further comprising a lever coupled to the at least one mounting bracket, wherein:

the lever is configured to rotate in relation to the at least one mount between a first and a second angular position of the lever; and the lever is further configured to prevent movement of the tray from the first to the second position of the tray when the lever is in the first angular position of the lever.

11. The bracket system of claim 2, further comprising at least one telescoping bracket connected to the tray and the at least one mount, wherein the at least one telescoping bracket is configured to facilitate the movement of the tray between the first and second positions of the tray.

12. The bracket system of claim 11, wherein the at least one telescoping bracket has a load capacity of about 45 pounds.

13. The bracket system of claim 11, further comprising a lever coupled to the at least one mount, wherein:

the lever is configured to rotate in relation to the at least one mount between a first and a second angular position of the lever; and the lever is further configured to prevent extension of the at least one telescoping bracket when the lever is in the first angular position of the lever to thereby retain the tray in the first position of the tray.

14. The bracket system of claim 2, wherein the strap comprises a cam strap.

15. A bracket system for storing and deploying an article of equipment, comprising:

at least one mounting bracket;

a tray mounted on the at least one mounting bracket and configured to translate linearly in relation to the at least one mounting bracket between a first and a second position of the tray;

a backplate mounted on the tray and configured to support the article of equipment;

a backplate support member securely connected to the backplate;

a cross member securely connected to the backplate support member; and at least one pin configured to rotatably couple the backplate support member to the at least one mount, wherein:

the backplate is configured to rotate in relation to the tray between a first angular position at which the backplate has a first elevation in relation to the tray, and a second angular position at which the backplate has a second elevation in relation to the tray; and the second elevation is lower than the first elevation.

16. The bracket system of claim 15, further comprising:

a locking plate coupled to and spaced apart from the backplate support member; and a stop mounted on the tray; wherein:

the locking plate is configured to move between a first and a second position in relation to the backplate support;

the locking plate is further configured to contact the stop when the locking plate is in the first position of the locking plate; and the stop is configured to interfere with rotation of the backplane support member, and with rotation of the backplate from the first to the second angular position of the backplate, when the locking plate is in the first position of the locking plate.

17. The bracket system of claim 16, wherein the backplate is further configured to rotate from the first to the second angular position of the backplate when the locking plate is in the second position of the locking plate.

18. A method for storing and deploying an article of equipment, comprising:

(i) providing a bracket system configured to hold the article of equipment, the bracket system comprising:

at least one mounting bracket;

a tray mounted on the at least one mounting bracket and configured to translate linearly in relation to the mounting bracket between a first and a second position of the tray; and a backplate mounted on the tray and configured to support the article of equipment, the backplate being configured to rotate in relation to the tray between a first angular position at which the backplate has a first elevation in relation to the tray, and a second angular position at which the backplate has a second elevation in relation to the tray, the second elevation being lower than the first elevation;

(ii) moving the tray from the first to the second position of the tray;

(iii) rotating the backplate from the first to the second angular position the backplate;

(iv) releasing a strap retaining the article of equipment on the backplate; and (v) lifting the article of equipment from the backplate.

19. The method of claim 18, wherein the article of equipment is a self-contained breathing apparatus.

* * * * *